(12) United States Patent
Valentin de Oliveira et al.

(10) Patent No.: US 11,333,304 B2
(45) Date of Patent: May 17, 2022

(54) PIPE APPARATUS, PIPE SYSTEM, AND METHOD OF DETECTING A LEAK IN A CONDUIT

(71) Applicant: UTI Limited Partnership, Calgary (CA)

(72) Inventors: Thiago Valentin de Oliveira, Calgary (CA); Dobromir Filip, Calgary (CA); Martin P. Mintchev, Calgary (CA)

(73) Assignee: UTI Limited Partnership, Calgary (CA)

( * ) Notice: Subject to any disclaimer, the term of this patent is extended or adjusted under 35 U.S.C. 154(b) by 348 days.

(21) Appl. No.: 16/621,215

(22) PCT Filed: Jun. 12, 2018

(86) PCT No.: PCT/CA2018/050700
§ 371 (c)(1),
(2) Date: Dec. 10, 2019

(87) PCT Pub. No.: WO2018/227284
PCT Pub. Date: Dec. 20, 2018

(65) Prior Publication Data
US 2020/0200329 A1    Jun. 25, 2020

Related U.S. Application Data

(60) Provisional application No. 62/518,266, filed on Jun. 12, 2017.

(51) Int. Cl.
*F17D 5/06* (2006.01)
*F16L 9/18* (2006.01)
(Continued)

(52) U.S. Cl.
CPC ............ *F17D 5/06* (2013.01); *F16L 9/18* (2013.01); *F16L 55/1022* (2013.01); *F16L 2201/30* (2013.01); *G01M 3/18* (2013.01)

(58) Field of Classification Search
CPC ..... F16L 9/16; F16L 55/1022; F16L 2201/30; F17D 5/00–06; G01M 3/00; G01M 3/16–18
See application file for complete search history.

(56) References Cited

U.S. PATENT DOCUMENTS 5,343,191 A    8/1994   McAtamney
5,349,568 A    9/1994   Kupperman
(Continued)

FOREIGN PATENT DOCUMENTS

WO    WO-2014091513 A3 *   9/2014   ............ G01M 3/38

OTHER PUBLICATIONS

International Search Report and Written Opinion of the International Searching Authority, dated Aug. 7, 2018, for corresponding International Application No. PCT/CA2018/050700, 8 pages.
(Continued)

*Primary Examiner* — Nguyen Q. Ha
(74) *Attorney, Agent, or Firm* — Klarquist Sparkman, LLP

(57)   ABSTRACT

There is described a pipe apparatus having two circular coaxial layers, inner and outer, defining an annular gap therebetween. At least one segmentation ring with a predesigned opening is placed within the annular gap. The pipe system is composed of interconnected pipe apparatuses of the same type. Compact wireless stations are embedded in the segmentation rings within sealed predesigned openings forming a wireless information and communication network (WICN). Each segmentation ring incorporates a pressure relief mechanism. When a layer of a given pipe apparatus breaks and fluid leaks into the annular gap in a given segment, the segmentation rings surrounding that segment temporarily retain the fluid and the WICN is disturbed in the affected area. At least one external central unit monitors
(Continued)

WICN activity and integrity inside the pipe system and detects such leakage, before the leak spreads to another segment of the pipe system, without reaching the outside environment.

20 Claims, 7 Drawing Sheets

(51) Int. Cl.
*F16L 55/10* (2006.01)
*G01M 3/18* (2006.01)

(56) References Cited

U.S. PATENT DOCUMENTS

| | | | |
|---|---|---|---|
| 6,032,699 A | 3/2000 | Cochran et al. | |
| 6,171,025 B1 | 1/2001 | Langner et al. | |
| 6,305,427 B1 | 10/2001 | Priest, II | |
| 6,442,999 B1 | 9/2002 | Baumoel | |
| 6,820,016 B2 | 11/2004 | Brown et al. | |
| 6,889,538 B2 | 5/2005 | Booles | |
| 7,114,516 B2 | 10/2006 | Ito | |
| 7,225,664 B2 | 6/2007 | Hutchinson et al. | |
| 7,360,413 B2 | 4/2008 | Jeffries et al. | |
| 7,578,315 B2 | 8/2009 | Wilson | |
| 8,174,398 B2 | 5/2012 | Wien | |
| 8,234,911 B2 | 8/2012 | Jax | |
| 8,418,531 B2 | 4/2013 | Kenney et al. | |
| 8,660,595 B2 | 2/2014 | Jensen et al. | |
| 8,665,101 B2 | 3/2014 | Solomon | |
| 8,701,467 B2 | 4/2014 | Carns et al. | |
| 8,717,183 B2 | 5/2014 | Pal et al. | |
| 8,794,675 B2 | 8/2014 | Baylot et al. | |
| 8,820,143 B2 | 9/2014 | Sarma et al. | |
| 8,838,399 B2 | 9/2014 | Ryan et al. | |
| 8,850,871 B2 | 10/2014 | Schaefer et al. | |
| 8,922,988 B2 | 12/2014 | Swett et al. | |
| 9,228,919 B1 | 1/2016 | Hawwa et al. | |
| 9,274,020 B2 * | 3/2016 | Chernov | G01M 3/045 |
| 9,335,233 B2 | 5/2016 | Khalifa et al. | |
| 9,470,343 B2 | 10/2016 | Herro et al. | |
| 9,470,601 B1 | 10/2016 | Chaudhary et al. | |
| 2002/0073768 A1 | 6/2002 | Joynes | |
| 2002/0134140 A1 | 9/2002 | Baumoel | |
| 2005/0166666 A1 | 8/2005 | Tsukagoshi | |
| 2007/0157705 A1 | 7/2007 | Bilstad et al. | |
| 2008/0300803 A1 | 12/2008 | Drake et al. | |
| 2011/0227721 A1 | 9/2011 | Mezghani et al. | |
| 2012/0103069 A1 | 5/2012 | Al-Qahtani et al. | |
| 2013/0125626 A1 | 5/2013 | Pritchett | |
| 2013/0214936 A1 | 8/2013 | Schuberth | |
| 2014/0028459 A1 | 1/2014 | Solomon | |
| 2015/0000380 A1 | 1/2015 | Cho et al. | |
| 2015/0002300 A1 | 1/2015 | Cho et al. | |
| 2015/0068288 A1 | 3/2015 | Gaudet et al. | |
| 2015/0198497 A1 | 7/2015 | Merlob | |
| 2015/0253215 A1 | 9/2015 | Tomiyama et al. | |
| 2016/0349140 A1 | 12/2016 | Teymouri | |

OTHER PUBLICATIONS

Backman et al., "Rechargeable Battery Condition Monitoring using Vibrational Properties," Proceedings of the 2014 IEEE Symposium on Product Compliance Engineering (ISPCE), 2014, pp. 50-53.

Chen et al., "Electrical Performance of a High-Temperature 32-I/O HTCC Alumina Package," Proceedings of the International Conference on High Temperature Electronics (HiTEC 2016), National Aeronautics and Space Administration, May 10, 2016, 17 pages.

\* cited by examiner

PIPE APPARATUS, PIPE SYSTEM, AND METHOD OF DETECTING A LEAK IN A CONDUIT

CROSS REFERENCE TO RELATED APPLICATIONS

This is the U.S. National Stage of International Application No. PCT/CA2018/050700, filed Jun. 12, 2018, which in turn claims the benefit of U.S. Provisional Application No. 62/518,266, filed Jun. 12, 2017. The provisional application is incorporated herein in its entirety.

FIELD OF THE DISCLOSURE

The present disclosure relates to an interconnectable pipe apparatus, and to a pipe system comprising multiple such pipe apparatuses.

BACKGROUND TO THE DISCLOSURE

For over a century pipe systems played an important role in world economy. Transmission of fluids, such as oil, water and natural gas, became more efficient with the implementation of pipe systems. Cross-border pipe systems have also been developed, and currently a complex mesh of interconnected pipe systems is seen across the globe.

However, a main concern when transmitting fluids (liquids or gases) through pipe systems is the risk of leakage. For instance, when oil is spilled in a water reservoir, the water is contaminated and becomes a danger to the community. Soil can be easily contaminated once a spill has occurred. Treatment of the affected area in such scenarios is extremely expensive and can last years, if at all possible.

In addition, leakages have profound negative impact not only on the economic profile of the industry involved and on the environment, but also on the public opinion regarding pipe-based transmissions. Thus, new pipe system projects and, particularly, new complex interconnected pipelines can be disturbed to a point of cancellation.

One of the technologies that has been proposed to detect leakages in pipes is monitoring the physical properties of a particular fluid that is flowing through a given pipe system. Ryan, U.S. Pat. No. 8,838,399 describes a method to estimate the location of a leak in a pipeline, by feeding the pipe with a fluid, whose properties are known, and monitoring both flow rate and pressure within the pipeline. Ryan utilizes mathematical models that have as inputs the monitored variables from his proposed tests to estimate the location of where the leak happened.

Another technique, Schaefer et al., U.S. Pat. No. 8,850,871, describes a method for identifying and locating leaks in a pipeline by adding ultrasonic flow meters that monitor the changes in fluid flow. A controller coupled to the flow meters interprets change in flow and sound velocity within the pipeline and detects the leak.

Alternatively, Hawwa et al., U.S. Pat. No. 9,228,919, describe an optical method and system for leakage detection in fluid transporting pipelines. When the wall of a given pipe cracks at a given point and fluid leaks from it, the discontinuity of fluid flow caused by bubbles and entrained particles is detected by at least one pair of light transmitter and light sensor positioned at the pipe wall.

All these technologies have a critically important limitation—they can detect leaks only after these have occurred, rather than pre-emptively informing the operators of a leak before the latter has actually spilled out. Our proposition is that preventing the leakage from occurring is far more important than detecting such leakage after it has already happened. Leakage prevention allows mitigating the occurrence of any spills before any harmful impact on the environment can take place.

Sensor networks are utilized to monitor a given pipe system, with the aim of detecting possible leaks and decreasing economic losses and environmental pollution in both water and soil, which can be irreversible. Chaudhary et al., U.S. Pat. No. 9,470,601, describe a method and a system to localize a leak in a pipeline network, by deploying a plurality of sensors distributed along the pipeline network to monitor the activity of the pipeline network. When at least two of the sensors detect the event of a leak, the location of the leak can be determined by the distance between the sensors and the time difference between at least two registrations of the leak.

Although Chaudary et al. present a monitoring system solution, they propose a sensor network that is not able to prevent a leak from happening. Moreover, additional data processing is required in order to successfully identify a leak and its location. The addition of a software layer to the existing hardware implementations to introduce signal processing techniques can improve efficiency of the monitoring systems. However, it does not change the limitation of not providing a leakage prevention capability.

Booles, U.S. Pat. No. 6,889,538, describes a system for leak prevention and detection in a pipeline that is composed as a double-pipe system. In this system, a liquid leakage detection device is added to monitor the activity of the liquid and to detect any leakage before it spills out into the external environment. However, a longer version of the pipe system described in this patent would not be feasible to implement as the monitoring devices are added externally to the pipe system instead of being installed within the pipe system. Additionally, Booles does not envision the utilization of a wireless network to integrate the information collected internally from the pipe system to an external central unit that can alert a human operator of such an event. Most importantly, any leakage in the interstitial space between the embedded pipes would not be immediately detected since there will be a distance between the location of the leak and the leakage detection device. In addition, the location of the leak cannot be detected.

Recent approaches in pipe system monitoring demonstrate that employing wireless sensor networks (WSN) is very beneficial to the field, since in the last few years both sensors and wireless devices have become more cost-effective and more accessible. Jeffries et al., U.S. Pat. No. 7,360,413, describe a method and a system to detect water leak in a pipe system utilizing a WSN for monitoring water flow. WSNs can be quite sophisticated to operate, especially under broad temperature and pressure changes, which can result in operational delays and the detection can come quite late. Additionally, Jeffries et al. do not explore the concept of leakage prevention. Therefore, this technology is not sufficient to fully address the economic and environmental issues caused by pipe leakages, because it reacts to already occurring leaks.

Implementing a wireless information and communication network along a pipe system is feasible, and has been suggested before. However, positioning the electronic devices within the inner pipe layer where the fluid flows can not only damage the electronic devices after long exposure to the dynamic fluid flow, but can also degrade the integrity of the wireless information and communication network. Jensen et al., U.S. Pat. No. 8,660,595, describe an alternative system where the pipe is composed of different layers and the wireless electronic devices are placed in a nonconductive coating layer of the pipe.

In Jensen et al., the communication scheme is based on a waveguide technique and relies on having electrically conductive material in the adjacent layers of an electrically nonconductive coating. Such electrically conductive material can be built-in in the pipe or it can be an external medium, such as salty seawater. This approach is both complex to implement and not reliable, especially for fluids in gaseous phase. Moreover, this patent only focuses on a wireless communication arrangement, rather than having a leakage detection (and prevention) feature. Therefore, any leak in the electrically nonconductive coating will not be immediately detectable, since the integrity of the electrically nonconductive coating will not be instantaneously disturbed. Thus, the radio frequency conductivity of the waveguide will be affected only when the electrically nonconductive coating becomes almost totally eroded by the leak, and most likely the leak detection will come quite late, particularly if the pipe system is long. In addition, the point of the initial leak will be impossible to locate.

Wilson, U.S. Pat. No. 7,578,315, describes a compound pipe element that consists of an inner pipe layer and an outer pipe layer. Baylot et al., U.S. Pat. No. 8,794,675, describes a coaxial pipe element that also consists of inner and outer pipe layers. These patents describe a concept in which double-layer pipes can be used for different purposes, such as transmitting different fluids and/or having insulating pipe layers. However, these patents do not disclose any leakage detection (and prevention) feature.

Hutchinson et al., U.S. Pat. No. 7,225,664, describe a double-wall pipe system that utilizes the annular space for detecting pressure change due to a leak. In order for this to happen, the annular space is pressurized by an external pump, and a single pressure sensor detects changes in pressure due to an eventual leak. However, with this technology, the location and the propagation of the leak cannot be identified.

Jax, U.S. Pat. No. 8,234,911, proposes a method and apparatus for detecting a leak in a double pipe. An external pump pumps a medium into the gap between the two pipe layers, while appropriate sensors monitor pressure and mass flow on both ends of the pipeline. If there is a leakage from the inner pipe layer into the gap, the time at which the leakage is registered by at least one of the sensors is utilized with the mass flow measurements to mathematically localize the place of the initial leak. However, Jax relies on a sensor network that is not able to monitor the propagation of the leak after its initial location is determined.

The present disclosure seeks at alleviate or remedy at least some of the deficiencies of the above-identified prior art.

SUMMARY OF THE DISCLOSURE

In embodiments, there is presented a double-layer pipe apparatus that introduces an extra level of leakage protection combined with real-time leak localization and propagation monitoring. The pipe system comprises at least two connected and interlocked pipe apparatuses and is designed in such way that the inner pipe layer is used for fluid-transmitting purposes. The annular airgap, or gap, defined between the two pipe layers, the inner layer and the outer layer, is conductive of radio frequency signals. Segmentation rings are positioned in the annular airgap between the two pipe layers. At least two predesigned openings in each segmentation ring are utilized. The predesigned lower opening is for hosting electronic devices and sensors, and for providing passage for electric power supply lines. The predesigned upper opening is for pressure relief but can also be utilized for hosting electronic devices, valves and sensors. The predesigned openings can be sealed with an appropriate sealant and so can be a portion of, or the entire, circumference of each segmentation ring. In the proposed solution, the utilization of predesigned openings of the segmentation rings is for the initial localization of any leakage without lateral pressure in the given segment bursting the second pipe layer, but rather to propagate longitudinally but in stepwise pattern to neighboring segments. Two adjacent segmentation rings retain the leaked fluid within the defined segment of the annular airgap, while preserving the radio frequency conductivity within the annular airgap until it is filled with the leak and the predesigned upper pressure relief opening of one of the segmentation rings surrounding the leaking segment gives in.

Wireless information and communication stations are positioned within the predesigned lower opening of each segmentation ring located in the annular airgap of any given pipe apparatus, and is isolated from the fluid that flows through the inner layer of the pipe with an appropriate sealant. A wireless information and communication network is established within the annular airgap along the pipe system comprising of interconnected double-layer pipe apparatuses and extends to at least one external wireless information and communication station which connects to a central unit.

The central unit monitors the integrity of the wireless information and communication network within the pipe system. In case of a leakage from any of the two pipe layers into the annular airgap delimited by two segmentation rings, the annular airgap in the segment floods. The wireless information and communication network within the annular airgap of this particular segment is disturbed and this is detected by the central unit. Once the annular airgap of the given leaking segment floods and a predetermined pressure threshold is achieved, the at least one segmentation ring starts leaking through at least one of its predesigned openings and the leaking fluid propagates into the annular airgap of an adjacent pipe segment. Subsequently, after the annular airgap of the adjacent segment floods, the central unit detects it as well, etc. It should be mentioned that the annular airgap in any given segments can be filled by the leak only if the pressure in it is appropriately relieved. This is achieved by the second predesigned opening at the top of each segmentation ring. In the simplest design, this opening is quite small and not sealed at all, and there is no other equipment installed in it. This opening can also be lightly sealed so that the sealant breaks once the pressure in the annular airgap of the given leaking segment rises. In more sophisticated designs, this predesigned upper pressure relief opening can be proactively used. In one non-limiting example, a mechanical pressure relief valve, accelerometer, or any other appropriate sensor or set of sensors can be embedded in the predesigned upper pressure relief opening, so that a secondary and clearer picture of the pressure buildup in the airgap of the leaking segment can be obtained, in addition to and concurrently with the wireless stations communication disturbance.

It is known that electromagnetic waves incur significant losses as they travel through liquids, such as water or diluted bitumen, mostly due to conductivity. This phenomenon is used to determine the location where such leakage has occurred, by determining which path of the wireless information and communication network cushioned in the annular airgap between the two pipe layers of adjacent segments is affected.

This approach allows for real-time monitoring of the integrity of the pipe system. Additionally, if fluid leaks from the inner pipe layer into the annular airgap of a given segment, the pipe system itself prevents the fluid from leaking from the outer pipe layer into the surrounding environment. Moreover, it can also detect a leak from the outer pipe layer into the annular airgap of a given segment before any such leak disturbs the integrity of the inner pipe layer in that segment. Therefore, the proposed technology explores the concept of leakage prevention by implementing a totally leak-free pipe system.

In the case of a gas leak, a small sensor can be integrated within each wireless information and communication station embedded into any segmentation ring located in the annular airgap of any given pipe apparatus, the sensor having a unique signature in the wireless information and communication network under normal operating conditions. When there is a gas leak into the annular airgap of a given pipe apparatus, the physical conditions in the annular airgap change. This change in physical conditions is detected by the sensor, and its unique signature in the wireless information and communication station changes, thus identifying the gas leak and the pipe segment in which it started. Again, the predesigned upper pressure relief openings in the segmentation rings can also be utilized to position in them gas sensors.

Thus, the present disclosure relates to an apparatus, a system and a method for a leak-free pipe setup that is internally monitored by a wireless information and communication network. By implementing a double-layer pipe system, an annular airgap is introduced between the two pipe layers, the inner layer and the outer layer. The annular airgap hosts segmentation rings that embed electronic devices which implement a wireless information and communication network. The wireless information and communication network is continuously monitored and detects any leakage from any given pipe layer, inner or outer, into the annular airgap of a given pipe segment, before the fluid that penetrated the annular airgap has negatively affected the operation of the pipe system or the surrounding environment. It is envisioned that the outer pipe layer maintains its integrity at all times, but if it happens that it loses integrity due to external and/or environmental factors, this will also be detectable by the wireless information and communication network embedded in the segmentation rings located in the annular airgap between the inner and the outer layer of any given pipe segment. The proposed pipe system, comprising numerous such segments, can leak into the surrounding environment only if the inner pipe layer and the outer pipe layer of a given pipe apparatus in the pipe system both leak simultaneously in a given segment, the probability of which would be very low. However, even in such circumstances, the embedded wireless information and communication network will report the event in real time.

The present disclosure introduces a novel leak-free pipe system comprising interconnected double-layer pipe apparatuses. The design of any given double-layer pipe apparatus allows for a substantial protection of the environment in which the pipe system is installed. Two coaxial layers, an inner layer and an outer layer, of the pipe apparatus define an annular airgap. At least one segmentation ring with predesigned openings is placed within the annular airgap. Some of the predesigned openings in the segmentation rings are sealed with a sealant designed to delimit adjacent annular airgaps of the pipe system, while preserving radio frequency conductivity in the annular airgaps.

A wireless information and communication network is installed in the predesigned openings of the segmentation rings installed within the annular airgap between the two layers of the pipe system. The wireless information and communication network is used to detect a leakage from any given pipe layer, inner or outer, into the annular airgap of any given pipeline segment. When such leakage occurs, at least one central unit located outside of the pipe system detects in real time the location of the leakage. Thus, the entire pipe system or a portion of the system can be shut down before the other pipe layer lets the fluid leak from the flooded annular airgap between the pipe layers.

The present disclosure relates to an apparatus, a system and a method to implement interconnected double-layer pipe apparatuses employing one or more wireless information and communication networks. The pipe system comprises at least one double-layer pipe apparatus, where the second pipe layer provides an extra level of leakage protection, regardless whether the leak comes from the inner layer or from the outer layer. The coaxial pipe layers define an annular airgap, in which segmentation rings are positioned to provide support for the structure and to segment adjacent apparatuses of the pipe system, defining distinct pipe segments. One pipe apparatus can represent one such segment, but is it also possible to have more than one segment in one pipe apparatus. Each pipe segment is defined by two adjacent segmentation rings. Each segmentation ring has at least two predesigned openings, lower and upper. The predesigned lower opening hosts a wireless information and communication station and possibly other relevant sensors connected to it. It is sealed with an appropriate sealant. The second predesigned opening in each segmentation ring is a pressure relief opening. It can be just left open, but it can also be lightly sealed. The predesigned upper pressure relief opening can host pressure relief valves, various sensors, and other devices deemed relevant. A wireless information and communication network is deployed within the annular airgap and extends along the length of the pipe system. Its stations are located in the lower opening of each segmentation ring. The wireless information and communication network is utilized to detect and monitor any leak of fluid (liquid or gas) from any of the two pipe layers (inner or outer) of a given pipe apparatus into its annular airgap.

For simplicity, from now on a leakage from the inner layer of a given pipe apparatus into its annular airgap will be discussed, with the clear understanding that the same considerations apply to leakage from the outer layer of a given pipe apparatus into its annular airgap, while the integrity of the inner pipe layer is preserved. In addition, one apparatus will be considered to represent one pipe segment, and therefore the words "apparatus" and "segment" will be interchangeably used. As mentioned before, it is assumed that the likelihood of both the inner and the outer pipe layers starting to simultaneously leak at the very same time in a given pipe apparatus is negligibly small.

When a leakage of fluid from the inner pipe layer of a given pipe apparatus into the annular airgap occurs, the wireless information and communication network constrained in the annular airgap is disturbed and detects in real time that such leakage has occurred. At least one external central unit, that is also wirelessly connected to the wireless information and communication network within the pipe system, detects that leakage has occurred and identifies the apparatus in which such leakage occurred, thus locating in real time the exact location within the pipe system where the leak started.

The segmentation rings that delimit adjacent pipe apparatuses of the pipe system are designed in such a way that there is a pressure relief mechanism when the annular airgap in the given pipe segment delimited by two opposite segmentation rings starts to be filled by fluid due to an eventual leak in that pipe segment of the pipe system. Thus, any annular airgap between two adjacent wireless information and communication stations located in this pipe segment of the pipe system will become fully submerged in the leaking fluid from the inner pipe layer and this will interrupt the integrity of the wireless information and communication network in this particular location. This interruption will be immediately detected by the wireless information and communication network monitoring system and the pipe segment in which the fluid has leaked from the inner pipe layer into its annular airgap will be identified in real time. Only after that, the fluid in the annular airgap in this problematic pipe segment will increase to the level of the predesigned upper pressure relief openings of the segmentation rings delimiting the leaking segment. Thus, the leak will start propagating into the annular airgap of an adjacent pipe segment, and this propagation can be detected in real time, while still there will be no external leak through the outer pipe layer into the environment.

In addition to the pressure relief mechanism associated with the predesigned upper pressure relief opening of each segmentation ring, the sealant of the predesigned lower opening of each segmentation ring is designed to handle the pressure of the fluid within the annular airgap as it floods. However, the pressure at which this sealant breaks is significantly lower than the pressure the outer pipe layer can withstand, guaranteeing that the outer pipe layer will not break because of the leak from the inner pipe layer into the annular airgap. This introduces a second layer of protection guaranteeing the longitudinal propagation of the leak from segment to segment, rather than lateral buildup of pressure potentially resulting in bursting of the outer protective layer. This approach reduces dramatically false alarms as well as leak misses.

In the case of identifying gas leak from the inner pipe layer into the annular airgap in a given segment, the wireless information and communication network can be upgraded to integrate appropriate sensors into the existing wireless information and communication stations. Each sensor can have a unique signature that is affected as conditions within the annular airgap change. This signature is transmitted through the wireless information and communication network, identifying that a gas leak into the annular airgap of a particular pipe apparatus has occurred and the location where the leak first occurred is identified. Such sensors can be installed in the lower or in the upper predesigned openings of each segmentation ring. In addition, various other supplementary sensors can be embedded in each segmentation ring, such as water sensors, hydrocarbon sensors, pressure sensors, motion sensors, humidity sensors, accelerometers, etc. Thus, the exact reason of the disturbance in the communication between the two wireless information and communication stations surrounding the problematic segment can be determined with a reduced risk of false alarms or leak omissions.

In a first aspect of the disclosure, there is provided an interconnectable pipe apparatus comprising: (a) inner and outer circular coaxial pipe layers defining an annular airgap (or "gap") between the inner and outer pipe layers, wherein the annular airgap is conductive of radio frequency signals; (b) at least one segmentation ring, with at least two predesigned openings, defining at least one segment in the interconnectable pipe apparatus; (c) sealant sealing some or all predesigned openings of the at least one segmentation ring, the sealant designed to break under certain predetermined pressure; (d) a mechanism to relieve pressure in the annular airgap as it is being filled with a leak, so that the air in the airgap is substituted by the leak; (e) a mechanism to connect and interlock the pipe apparatus with at least one other pipe apparatus of the same type, while uninterruptedly extending the inner and outer pipe layers at the junction of the two pipe apparatuses and preserving the radio frequency conductivity of the annular airgap through the sealant of the segmentation rings; (f) at least one electronic information and communication wireless module embedded in the at least one segmentation ring, comprising at least one wireless information and communication station located within the annular airgap and which is part of a wireless information and communication network; (g) means to detect and locate leaks from the inner and outer pipe layers into the annular airgap, utilizing the wireless information and communication network located in the annular airgap; and (h) interconnectable electric power supply lines running through the annular airgap.

Each pipe layer and each segmentation ring may comprise one or more of metal, plastic, high-density polyethylene, flexpipe, glass, fiberglass, ceramic, and concrete.

Each segmentation ring may have at least one predesigned opening that hosts a wireless information and communication station, the predesigned opening sealed with a sealant designed to break once a predetermined pressure threshold is achieved, the value of the predetermined pressure threshold being lower than the pressure the outer pipe layer can withstand.

Each segmentation ring may have at least one predesigned opening that provides a mechanism for pressure relief in case of the annular airgap experiencing increased pressure due to a leak or due to any other external impact.

The inner pipe layer may be weldable to an inner pipe layer of another pipe apparatus of the same type, and the outer pipe layer may be connected to the outer pipe layer of the other pipe apparatus of the same type by welding two external half-rings embedding the connection between the two adjacent outer pipe layers, while preserving the radio frequency conductivity along the annular airgap through the sealant of the at least one segmentation ring.

The inner pipe layer may be connected and interlocked to an inner pipe layer of another pipe apparatus of the same type through heat fusion along a border in the connection between the inner pipe layers, and the outer pipe layer may be connected to an outer pipe layer of another pipe apparatus of the same type by adding two external half-rings that embed the connection between the two adjacent outer pipe layers and utilizing heat fusion along borders of the outer pipe layers and external half-rings, while preserving the radio frequency conductivity along the annular airgap through the sealant of the at least one segmentation ring.

At least one wireless device containing an antenna, operating both as a receiver and as a transmitter, may be positioned in at least one predesigned opening of a segmentation ring along the annular airgap of the pipe apparatus to implement at least one wireless information and communication station, which may comprise at least one node within a wireless information and communication network.

Each wireless information and communication station may be labeled with a unique identification number identifying a respective segment in the pipe apparatus so that, when leakage from an inner or outer pipe layer into the annular airgap occurs, the two adjacent segmentation rings retain the leaked content in a segment of the pipe apparatus, thus flooding the annular airgap between the adjacent segmentation rings in that segment of said pipe apparatus, and interrupting the wireless communication between two adjacent wireless information and communication stations, identifying the location of the leak based on the status of the affected stations.

At least two interconnectable electric power supply lines may run longitudinally through the length of the annular airgap and may be positioned within the predesigned openings in the segmentation rings, the electric power supply lines used to supply power to the electronic devices embedded in the segmentation rings.

Each segmentation ring may comprise polyoxymethylene or an acetal homopolymer.

Each segmentation ring may comprise glass-ceramic matrix systems.

The sealants may comprise foam or a viscous paste.

Each wireless information and communication station may be implemented with a programmable radio frequency device.

At least one sensor may be integrated into the wireless information and communication stations to monitor the conditions within the annular airgap in any given segment of the pipe apparatus, the at least one sensor helping to identify the nature of any leak from the inner or outer piper layer into the annular airgap in that segment.

At least one pressure relief valve may be integrated into at least one predesigned opening of a segmentation ring to provide a mechanism for pressure relief in case of a rising pressure in the annular airgap of a given segment delimited by two adjacent segmentation rings.

One or more electronic components of the pipe apparatus may be cased in a high temperature and vibration protective package with predesigned cushion to reduce external vibrations.

In a further aspect of the disclosure, there is provided a pipe system comprising: (a) at least two pipe apparatuses connected and interlocked, the at least two pipe apparatuses being in accordance with any of the above-described embodiments; (b) segmentation rings having at least two predesigned openings, the segmentation rings defining a pipe segment and embedding wireless information and communication stations, a mechanism to relieve pressure, and one or more sensors; (c) a wireless information and communication network having a front end and a back end, deployed within the radio frequency conductive annular airgap along the length of the pipe system, with at least one wireless information and communication station per pipe apparatus, the wireless information and communication network wirelessly connected to at least one external central unit; (d) a map of the networked wireless information and communication stations that identifies uniquely the location of each station within the wireless information and communication network in the pipe system, the map being used to locate any leakage from the inner or outer pipe layer into the annular airgap; and (e) an external power supply that is electrically connected to the at least two electric power supply lines located within the annular airgap of each pipe apparatus.

The inner and outer pipe layers of adjacent pipe apparatuses may be connected and interlocked by first connecting and interlocking the inner pipe layers of two adjacent pipe apparatuses, and then connecting and interlocking the outer pipe layers of the two adjacent pipe apparatuses with the addition of two external half-rings.

The segmentation rings may provide support to the pipe system, delimit the annular airgaps of two adjacent pipe apparatuses of the pipe system, define at least one segment per pipe apparatus, and allow the annular airgap of any segment of the pipe system to flood when leakage from the inner or outer pipe layer into the annular airgap occurs into that segment, thus affecting the at least one wireless information and communication station of that segment and notifying the central unit, before one of the two opposite segmentation rings leaks and the annular airgap of an adjacent pipe segment starts to flood.

A first wireless information and communication station may be located at a front end of the pipe system, a last wireless information and communication station may be located at a back end of the pipe system, each of the other wireless information and communication stations directly communicating with the two wireless information and communication stations adjacent to it, and the last wireless information and communication station located within the pipe system wirelessly communicating with the wireless information and communication station of the central unit, located outside of the pipe system.

Each wireless information and communication station may identify any segment of any pipe apparatus, and an external central unit may monitor the internal wireless information and communication network by verifying the status of wireless information and communication stations to detect the location of a leakage.

An external power supply may be directly connected to a front end or to a back end of the pipe system, supplying power to the lines that run within the annular airgap along the length of the pipe system and powering up the devices located in the segments of the annular airgap.

Inner and outer pipe layers may be connected and interlocked by welding junctions of the inner and outer pipe layers and junctions between the inner and outer pipe layers and external half-rings.

Inner and outer pipe layers may be connected and interlocked by applying heat fusion in junctions of the pipe layers and in junctions between the pipe layers and external half-rings.

The length of the pipe system may vary from a few inches to thousands of miles.

A second external wireless information and communication station and a second central unit may be added, so that a front end and a back end of the pipe system may have central units sharing information received from the wireless information and communication stations located within the annular airgap of the pipe system, the central units being able to communicate through another network.

A voltage loss compensation circuit may be integrated with the electric power supply lines.

One or more of the following may be used to build the pipe system: (a) a double-layer elbow connector with segmentation rings, providing an angular change of the pipe system's axis, each end of which is connectable and interlockable to a double-layer pipe apparatus; (b) a double-layer coupling connector with segmentation rings, providing flexibility to extend the pipe system or to fit two portions of the pipe system without the need to employ another pipe apparatus, each end of the coupling connector being connectable and interlockable to a double-layer pipe apparatus, a double-layer elbow connector, or a combination thereof; and (c) a double-layer valve connector with segmentation rings, and a device for controlling the flow of fluid through the inner pipe layer of the pipe system, each end of the valve connector being connectable and interlockable to a double-layer pipe apparatus, a double-layer elbow connector, a double-layer coupling connector, or a combination thereof.

In a further aspect of the disclosure a method for leakage prevention and detection in interconnectable pipes comprising: connecting and interlocking both inner and outer layers of interconnected double-layer pipe apparatuses having an uninterrupted annular airgap between the inner and outer layers, the airgap preserving conductivity for radio frequency signals throughout the pipe system; delimiting adjacent pipe apparatuses into segments by introducing segmentation rings with predesigned openings designed to provide pressure relief and host wireless information and communication stations; (c) embedding at least one wireless information and communication station in a segmentation ring positioned within the radio frequency conductive annular airgap of any given pipe apparatus, defining a node of a wireless information and communication network that is constrained within the annular airgap of any given pipe segment in the pipe apparatus; (d) utilizing the wireless information and communication network constrained within the radio frequency conductive annular airgap to detect, locate and monitor leaks from the inner or outer pipe layers into the annular airgap of a given pipe segment, the network wirelessly communicating with at least one external central unit; and (e) distributing interconnectable electric power supply lines along the annular airgap.

In a further aspect of the disclosure, there is provided a conduit comprising: inner and outer coaxial conduit layers defining an annular airgap between the inner and outer conduit layers; at least one segmentation ring positioned within the annular airgap and comprising at least one opening formed therein, the at least one segmentation ring defining a first annular airgap portion on one side of the at least one segmentation ring, and a second annular airgap portion on the other side of the at least one segmentation ring; a sealant sealing the at least one opening, wherein the sealant is configured to break upon application of a predetermined pressure to the sealant and thereby cause the first and second annular airgap portions to enter into fluid communication with one another; a wireless communication device comprised within the segmentation ring and configured to receive wireless communications via the annular airgap; and a mechanism for relieving pressure in the annular airgap in response to the annular airgap being flooded by a leak, so that air in the airgap may be substituted by the leak.

The at least one segmentation ring may comprise multiple segmentation rings, and the wireless communication device comprised in one of the segmentation rings may be configured to receive wireless communications via the annular airgap from another wireless communication device comprised in an adjacent segmentation ring unless the annular airgap portion between the adjacent segmentation rings is flooded with a leak.

In a further aspect of the disclosure, there is provided a method of detecting a leak in a conduit, comprising: determining that communications between adjacent wireless communication devices have been interrupted, wherein the adjacent wireless communication devices are comprised in respective adjacent segmentation rings positioned within an annular airgap defined between inner and outer conduit layers of a conduit.

Any of the features described above in connection with the pipe apparatus, pipe system and conduit may be combined with the above-described methods.

Figure 1:
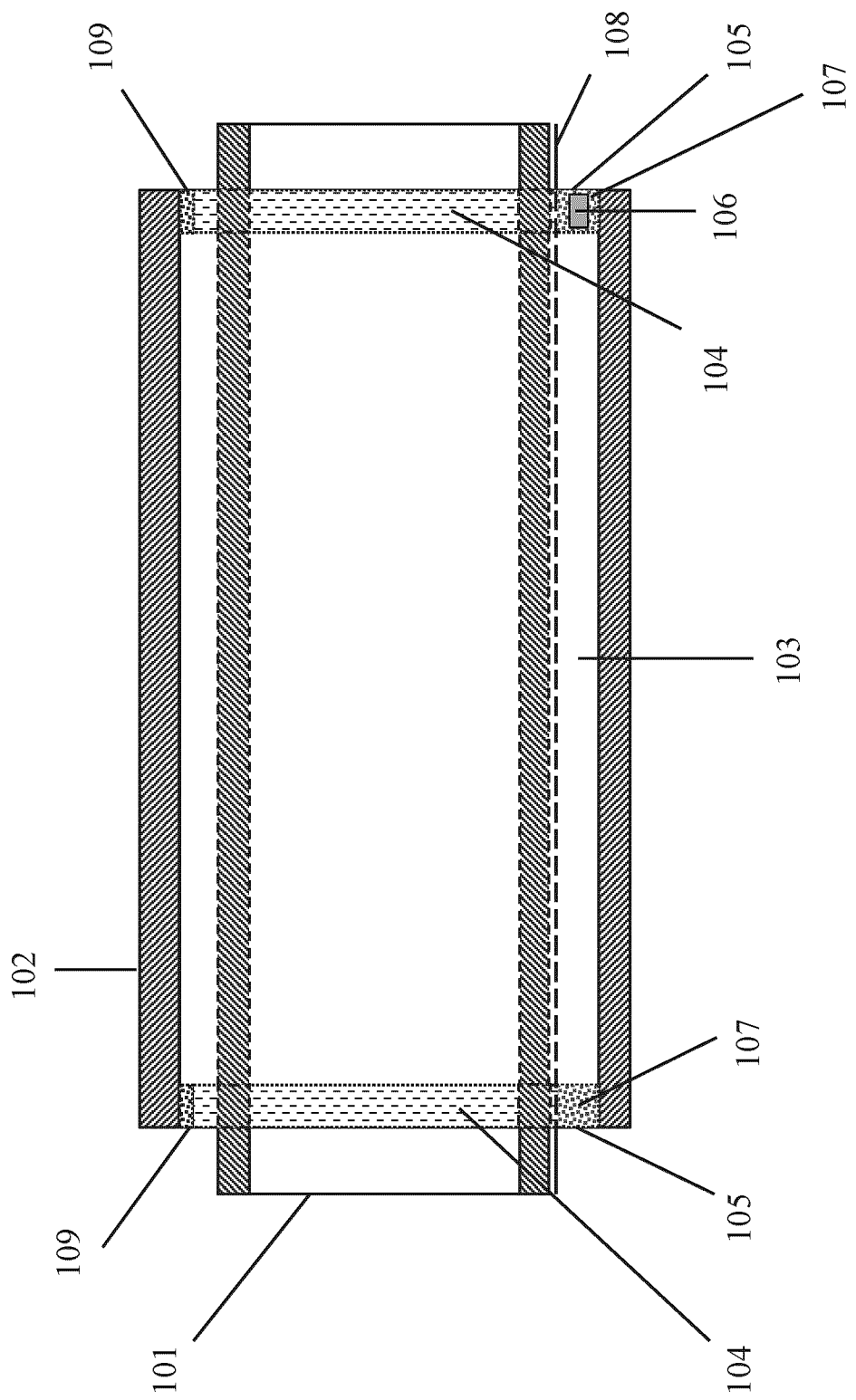
FIG. 1 illustrates a conceptual drawing of a double-layer pipe apparatus including two segmentation rings in a longitudinal view. The inner pipe layer 101 is placed in the interior of an outer pipe layer 102 and both layers have predetermined wall thicknesses. The outer pipe layer has an internal diameter larger than the external diameter of the inner pipe layer, so that a small annular airgap 103 is left between the layers. The annular airgap 103 can vary, for example, which is not meant to be limiting, from tenths of an inch to few inches and the optimal size is defined by the space needed for placing segmentation rings embedding relevant electronic devices in the annular airgap, and by the specific parameters of the transmitted fluid. A segmentation ring 104 is designed to fit tightly in the annular airgap 103, in which the wall thickness of the segmentation ring matches the width of the annular airgap. For example, which is not meant to be limiting, the segmentation rings 104 can be positioned close to the extremities of the outer pipe layer 102 of a given pipe apparatus. Each segmentation ring 104 has at least two predesigned openings 105 and 109. One of the predesigned openings 105 is located on the bottom part of the pipe apparatus, the other predesigned opening 109 is located on the top part of the pipe apparatus. One of the segmentation rings 104 hosts an encased wireless information and communication station 106, implemented by a programmable radio device. The predesigned lower opening 105 of each segmentation ring 104 is sealed with an appropriate sealant 107. Both segmentation rings 104 have their predesigned lower openings 105 hosting the electric power supply lines 108 that are positioned within the annular airgap 103 along the pipe system, the predesigned lower openings 105 being sealed with the sealant 107 once the electric power supply lines 108 are positioned. It is possible also to use the sealant 107 to seal the segmentation rings 104 along their circumference, including the predesigned upper pressure relief openings 109, the segmentation rings are positioned in the pipe apparatus. The minimal number of segmentation rings per pipe apparatus is one, but including two segmentation rings at the ends of a single pipe apparatus provides for better structural stability of the pipe system comprising interconnected pipe apparatuses. In the case of including two segmentation rings per pipe apparatus, it is not necessary each of them to host wireless information and communication station, as illustrated in FIG. 1.
Figure 2:
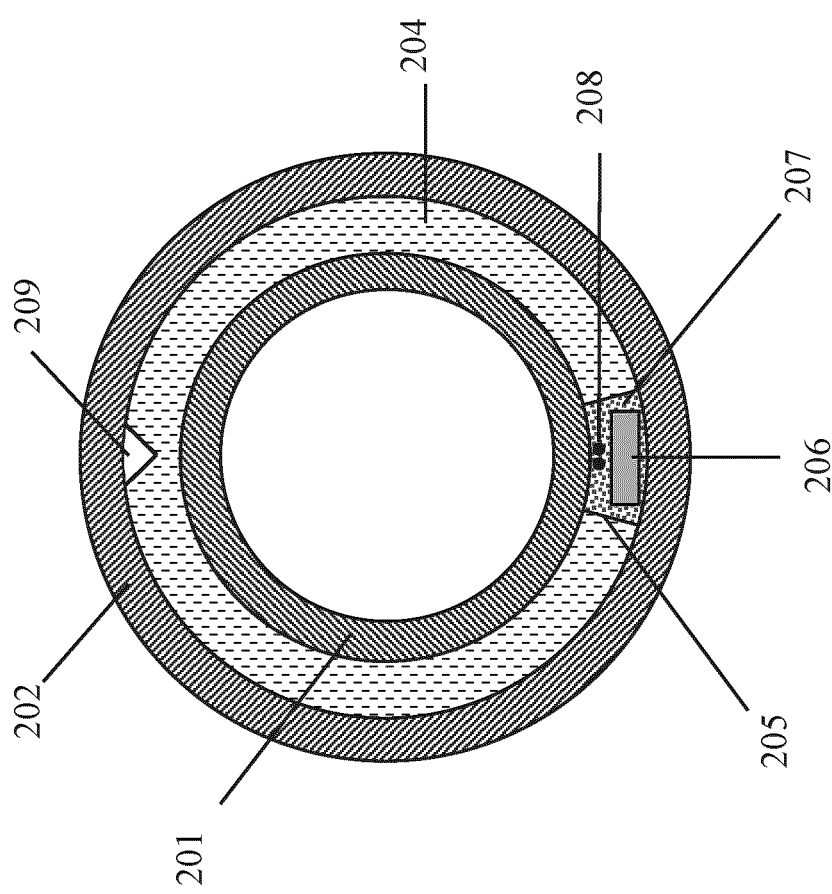
FIG. 2 depicts a coaxial view of the double-layer pipe apparatus. The inner pipe layer 201 is positioned inside the outer pipe layer 202, so that both layers are coaxial and define an annular airgap. The segmentation rings 204 are positioned within the annular airgap. Each segmentation ring 204 has at least two predesigned openings 205 and 209. The predesigned lower opening 205 is located on the bottom part of the pipe apparatus. The predesigned upper pressure relief opening 209 is located on the top part of the pipe apparatus. At least one of the segmentation rings 204 has the predesigned lower opening 205 hosting an encased wireless information and communication station 206. The segmentation rings 204 have their predesigned lower openings 205 hosting the electric power supply lines 208 that are positioned within the annular airgap along the pipe system. Once the electric power supply lines 208 are positioned, the predesigned lower openings 205 in the segmentation rings 204 are sealed with the sealant 207. As mentioned before, the sealant 207 can be utilized to seal each of the segmentation rings 204 around its circumference as well, including the second predesigned upper pressure relief opening 209.

The first wireless information and communication station 406, located at the front end of the pipe system, sends an information package to the second wireless information and communication station 416 to acknowledge that the station is active. Then, the second wireless information and communication station 416 sends an information package to the third wireless information and communication station 426 to acknowledge its own active status, and route the information packages received from wireless information and communication station 406 towards wireless information and communication station 426. The wireless information and communication station 426 receives the information packages coming from the preceding wireless information and communication station 416, integrates them with its own signature and forwards the information package to the next wireless information and communication station 436. All wireless information and communication stations perform the same way, until all information packages sent through the wireless information and communication network reach the last wireless information and communication station 436, located at the back end of the pipe system. Then, the last wireless information and communication station 436 forwards all received information packages from previous wireless information and communication stations to an external wireless information and communication station 446. Finally, the external wireless information and communication station is connected to a central unit 447 that monitors in real time the wireless information and communication network.

If a leakage from the inner pipe layer into the annular airgap occurs in any individual pipe apparatus along the pipe system, the annular airgap of this individual apparatus will flood because it will be initially delimited by two sealed segmentation rings. The flooding will affect the wireless information and communication network between two adjacent wireless information and communication stations. As the flooded area disturbs the wireless information and communication network, all wireless information and communication stations located proximally to the area where the leakage occurred will no longer be able to transmit information through the wireless information and communication network towards the central unit. Therefore, the central unit 447 can detect in real time the location of the particular pipe apparatus within the pipe system in which such leakage first occurred.

Figure 4:
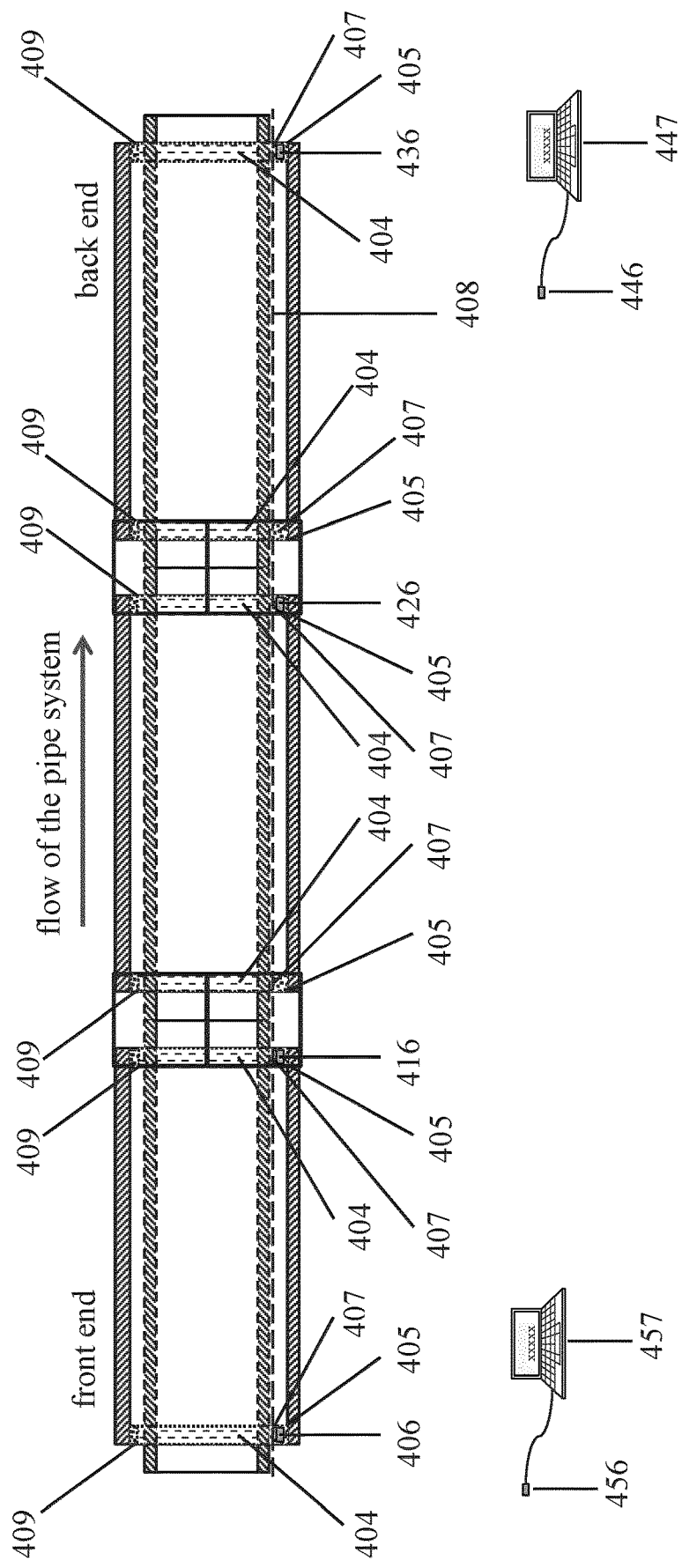
FIG. 4 shows the general concept of a pipe system including its own wireless information and communication network connected to two central units that monitor the pipe system. The first wireless information and communication station 406 is located at the front end of the pipe system, within the predesigned lower opening 405 of the segmentation ring 404. All segmentation rings 404 have at least two predesigned openings. The predesigned lower opening 405 is located on the bottom of each pipe apparatus. The predesigned upper pressure relief opening 409 is located on the top of each pipe apparatus. All predesigned lower openings 405 are sealed with a sealant 407 after the electric power supply lines 408 and the wireless information and communication stations 406, 416, 426 and 436 have been positioned. In addition, each segmentation ring 404 can be sealed with the sealant 407 along its circumference, including the predesigned upper pressure relief opening 409.

If the direction and the dynamics of propagation of the internal leak are to be precisely identified, a second external wireless information and communication station 456 can be installed, communicating with another central unit 457 (see FIG. 4). In this case, the information packages are sent and forwarded within the wireless information and communication stations from the back end of the pipe system to its front end, the wireless information and communication station 406 gathering the information packages from the wireless information and communication network and sending them to the external wireless information and communication station 456 and the central unit 457.

For this configuration, both central units 447 and 457 are connected through another network, such as the Internet. Each external wireless information and communication station 446 and 456 monitors from each end of the pipe system the location and the time of the closest pipe apparatus that had its wireless information and communication station losing communication with the wireless information and communication network. Based on this information, the central units 447 and 457 are able to identify both the direction and the speed of the stepwise propagation of the leak along the annular airgap of the segmented pipe system.

Figure 5:
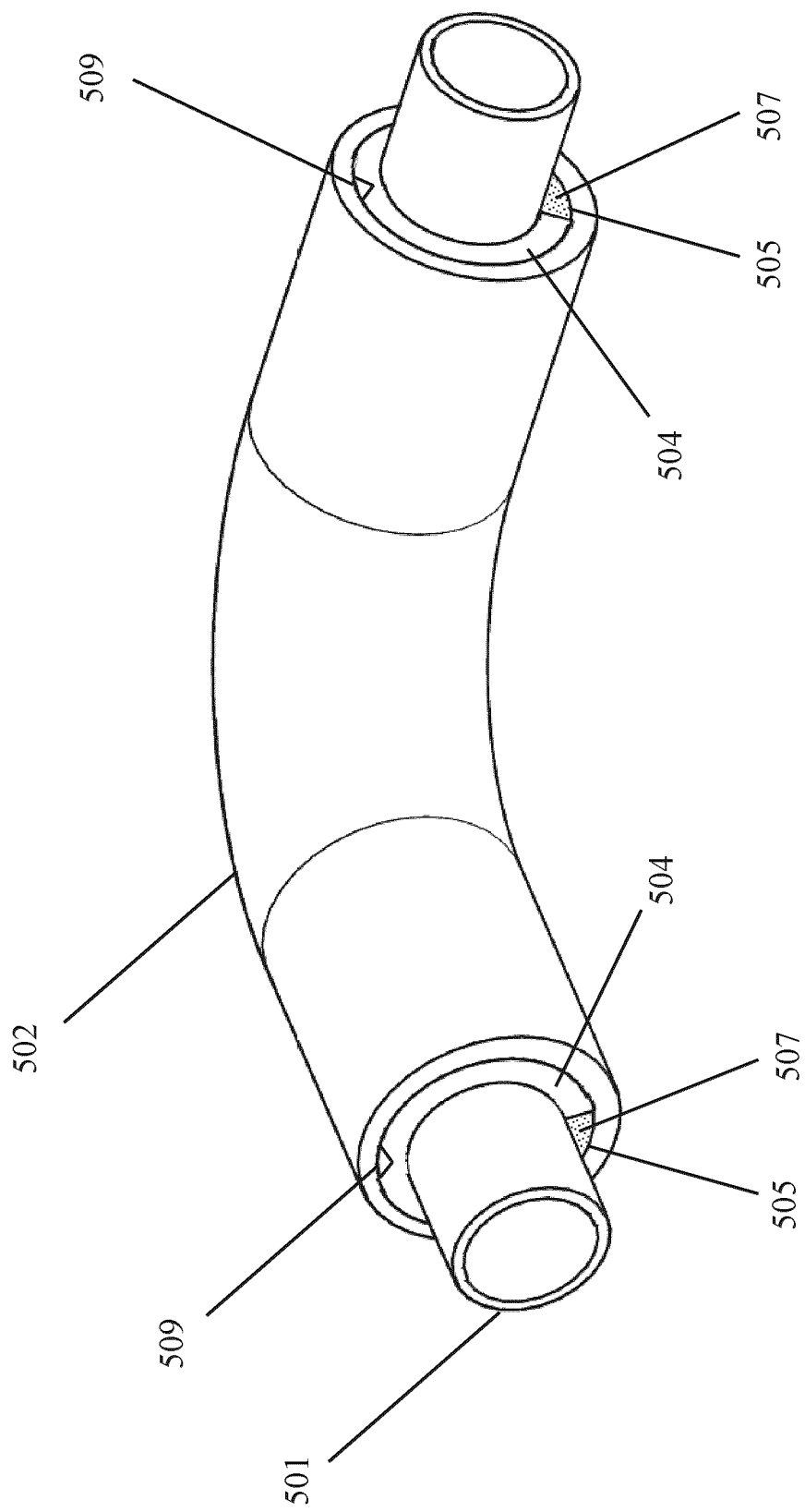
Figure 6:
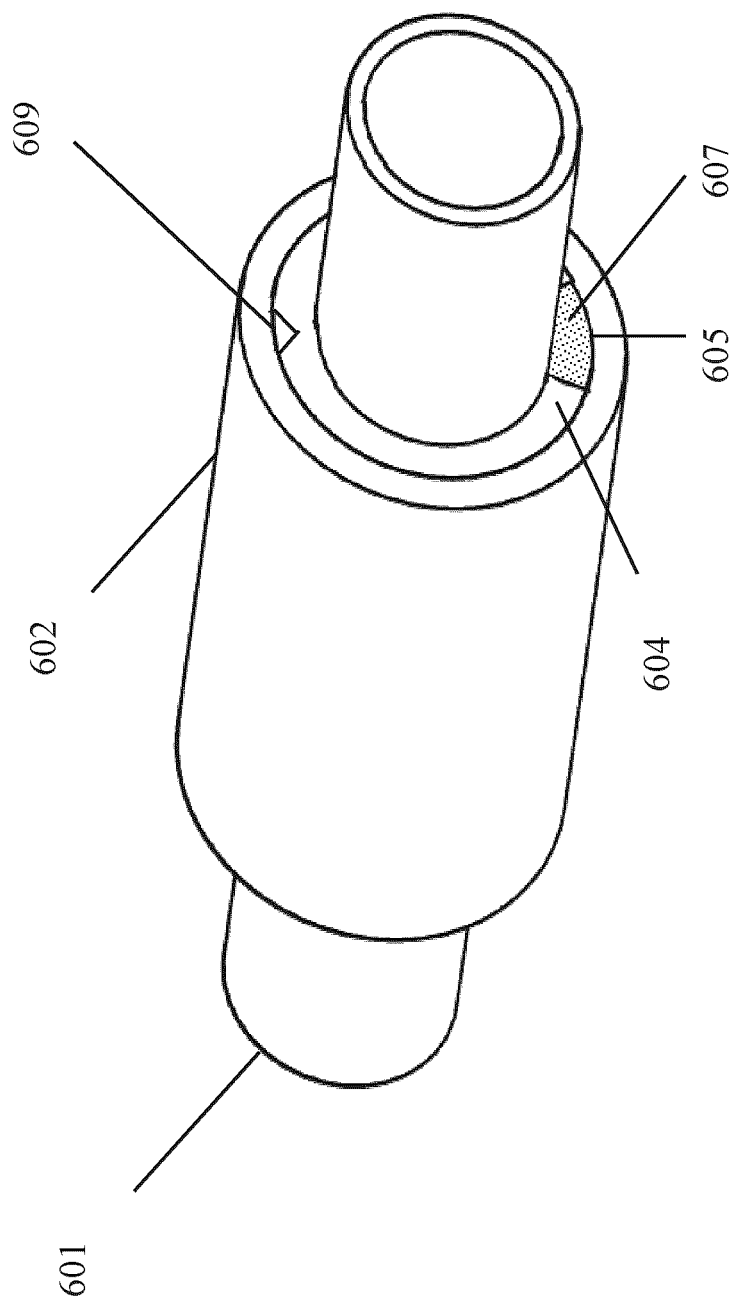
Figure 7:
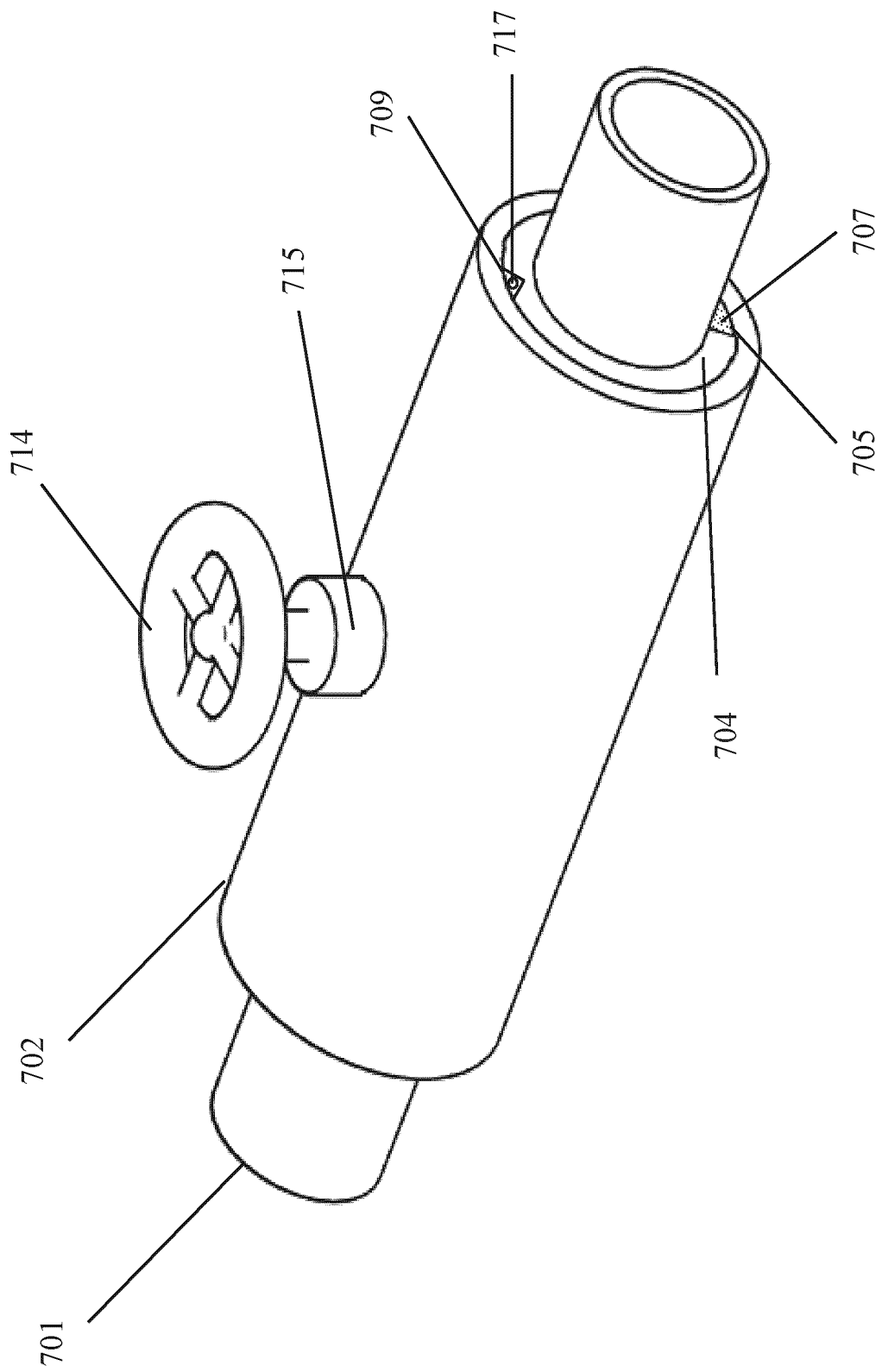

FIGS. 5 to 7 illustrate examples of some connectors that can be utilized in the proposed pipe system, which are not meant to be limiting. All connectors adopt the same concept of having a double-layer pipe and therefore are fully compatible with the proposed pipe apparatuses. The connectors also keep the feature of having the inner pipe layer longer than the outer pipe layer, so that the procedure of connecting and interlocking connectors and pipe apparatuses can be performed appropriately, as well as to allow standard pipe correction testing procedures, such as X-rays, after the connection has been completed.

FIG. 5 illustrates a 90° elbow as an example of an elbow connection. The inner pipe layer 501 and the outer pipe layer 502 are supported by the segmentation rings 504 with their predesigned lower openings 505 sealed with sealant 507 and positioned on the bottom. The predesigned upper pressure relief openings 509 are positioned on the top and are left opened. The angle of such connector is not limited to 90° and the connector can be built with any desired angle.

FIG. 6 illustrates a coupling device that fits any two pipe apparatuses without providing any change in the angle of the current section of the pipe system, therefore applicable only for extension purposes. The inner pipe layer 601 and the outer pipe layer 602 are supported by segmentation rings 604 with their predesigned lower openings 605 sealed with a sealant 607 and positioned on the bottom, while the small predesigned upper pressure relief openings 609 are positioned on the top and are left opened.

FIG. 7 illustrates a mechanical valve that controls the flow of fluid within the inner pipe layer. The inner pipe layer 701 and the outer pipe layer 702 are supported by segmentation rings 704 with their predesigned lower openings 705 sealed with a sealant 707 and positioned on the bottom. The predesigned upper pressure relief openings 709 are positioned on the top and incorporate a pressure relief valve 717. The hand wheel 714 performs actual control of the opening and the closing of the fluid flow within the inner pipe layer. The valve seat 715 provides support for the hand wheel 714 and connects the hand wheel to both pipe layers 701 and 702. For example, which is not meant to be limiting, the valve seat 715 can be welded and flanged to both pipe layers 701 and 702.

DETAILED DESCRIPTION OF SPECIFIC EMBODIMENTS

The present disclosure seeks to provide a pipe apparatus, a pipe system, and a method of detecting a leak in a pipe. While various embodiments of the disclosure are described below, the disclosure is not limited to these embodiments, and variations of these embodiments may well fall within the scope of the disclosure which is to be limited only by the appended claims.

As used herein, a reference to "about" or "approximately" a number or to being "substantially" equal to a number means being within +/−10% of that number.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

A double-layer pipe apparatus depicted in FIG. 1 comprises two coaxial pipe layers 101 and 102 and an annular airgap 103 between the two pipe layers. Segmentation rings 104 are placed within the annular airgap 103 to maintain the shape of the annular airgap and to keep the structure of the pipe apparatus fixed. While the inner pipe layer 101 is used for transmitting fluid, which can be either liquid or gas, the annular airgap 103 is maintained filled with air. Within the annular airgap, at least one compact electronic wireless information and communication station 106, equipped with an antenna, is embedded within at least one segmentation ring 104 and is protected by a sealed hermetic package.

The proposed pipe system is implemented by connecting and interlocking several double-layer pipe apparatuses of the same kind. At least two electrical power supply lines 408 (see FIG. 4) run longitudinally through the annular airgap and power up the electronic devices therein deployed. Each wireless information and communication station is a node in a wireless information and communication network that extends along the pipe system. Each wireless information and communication station has its own identification number that identifies the given pipe apparatus in which it is located and adjacent wireless information and communication stations along the pipe system are separated by an optimal distance, segmenting the pipe system.

One wireless information and communication station communicates directly with one of the adjacent stations along the line by generating or capturing electromagnetic waves that travel longitudinally along the pipe system through the annular airgap. Each station within the wireless information and communication network generates an information package containing its identification number, status and possibly additional sensory information, and transmits the information package to the next station along the line. The wireless information and communication stations also work as routers, by retransmitting received information packages from the previous wireless information and communication station to the next one, until the information packages reach the last wireless information and communication station along the pipe system. This last wireless information and communication station 436 (see FIG. 4) finally forwards all received information packages to an external wireless information and communication station 446 located outside of the pipe system. This external wireless information and communication station 446 is directly connected to a central unit 447. The central unit 447 keeps a log of the received data and evaluates the integrity of the wireless information and communication network within the pipe system by verifying the status of all wireless information and communication stations. When a leakage of fluid from the inner pipe layer into the annular airgap of a given pipe apparatus occurs, a portion of the air in the annular airgap where the leakage occurs is replaced by the leaked fluid. As a certain threshold of volume of the leaking fluid is achieved in the annular airgap of the given pipe apparatus in which the inner pipe has leaked, the electromagnetic waves that travel through the annular airgap become severely attenuated due to the leaked fluid and the latter interrupts the wireless information and communication network. Thus, the information packages sent from the wireless information and communication stations before the leakage location are no longer received at the central unit. Due to the missing data, the central unit can identify that leakage has occurred along the pipe system, at a given pipe apparatus.

The segmentation rings 404 (see FIG. 4) are designed to allow the leakage into the annular airgap to flood one pipe apparatus of the pipe system first, therefore notifying the wireless information and communication network of such event. After the first leakage alert has been issued, at least one of the segmentation rings 404 leaks through its predesigned upper pressure relief opening 409, or, if the pressure rises abruptly, has its sealant 407 in its predesigned lower opening 405 break under the increasing pressure in the annular airgap and lets the fluid flow into the annular airgap of an adjacent pipe apparatus of the pipe system. The adjacent annular airgap gradually floods and a second leakage alert is issued, thus identifying the direction of the leak in a stepwise fashion.

Based on the status of each wireless information and communication station, the location of where the leakage first occurred is promptly identified. If the direction of propagation of the leak is to be determined, a second external wireless information and communication station 456 (see FIG. 4) and a second central unit 457 can be added at the other end of the pipe system. With this setup, both central units 447 and 457 are able to detect, from each end of the pipe system, the closest pipe apparatus that has been flooded. Also, by analysing the history of the communication paths that have been lost, the central units can monitor both the direction in which the leaked fluid is flowing and the velocity of the stepwise propagation of the leak. At any point of time after the initial leak detection, the pipe system can be shut down immediately and action can be taken to repair the leak before it has leaked into the external environment from the outer pipe layer.

For example, which is not meant to be limiting, if the pipe system can be comprised of four wireless information and communication stations, as illustrated in FIG. 4, and a leakage from the inner pipe layer into the annular airgap occurs in the pipe apparatus located between the two wireless information and communication stations 416 and 426, the two wireless information and communication stations will lose communication between each other after the annular airgap floods. In this scenario, the external wireless information and communication station 446 will detect that the wireless information and communication stations 426 and 436 are still active in the wireless information and communication network, while losing communication with the remaining wireless information and communication stations 406 and 416. Meanwhile, the external wireless information and communication station 456 will detect that the wireless information and communication stations 406 and 416 are still active in the wireless information and communication network, while losing communication with the remaining wireless information and communication stations 426 and 436. Since the two central units can communicate through another network, such as the Internet, the data received by each one of them can be shared to evaluate the integrity of the wireless information and communication network within the pipe system. In this case, the pipe apparatus that is constrained between the wireless information and communication stations 416 and 426 will be identified as the location of the leakage. If the fluid continues to leak within the annular airgap, the pressure in the segment increases and the leak reaches the predesigned upper pressure relief opening 409, with possibly at least one sealant 407 of the predesigned lower opening 405 of one of the segmentation rings 404 breaking, and the annular airgap in an adjacent pipe apparatus will start to flood. In this example, if the sealant 407 of the segmentation ring 404 that hosts the wireless information and communication station 426 breaks, and the sealant 407 of the subsequent segmentation ring 404 breaks as well, the annular airgap between the wireless information and communication stations 426 and 436 will flood. Finally, the external wireless information and communication station 446 will detect that the wireless information and communication station 436 is the only one active in the network, while the external wireless information and communication station 456 will be seeing the same profile from the other end of the pipe system as it was seen before, the wireless information and communication stations 406 and 416 being active. This information contributes to identifying the direction in which the fluid is leaking through the annular airgap. Based on the time difference between the two events (communication between the wireless information and communication stations 416 and 426 being lost and communication between the wireless information and communication stations 426 and 436 being lost), the velocity of propagation can also be determined.

The optimal distance between two adjacent wireless information and communication stations may be determined by two factors. First, the distance should be such that two adjacent wireless information and communication stations can reliably communicate through the air within the annular airgap in the absence of any leakage. Second, in the presence of a fluid leakage, the flooded annular airgap between the two adjacent segmentation rings should affect directly the path of the wireless information and communication network, shutting down the network at the referred point. For example, which is not meant to be limiting, this distance can vary from few inches to several feet.

Figure 3:
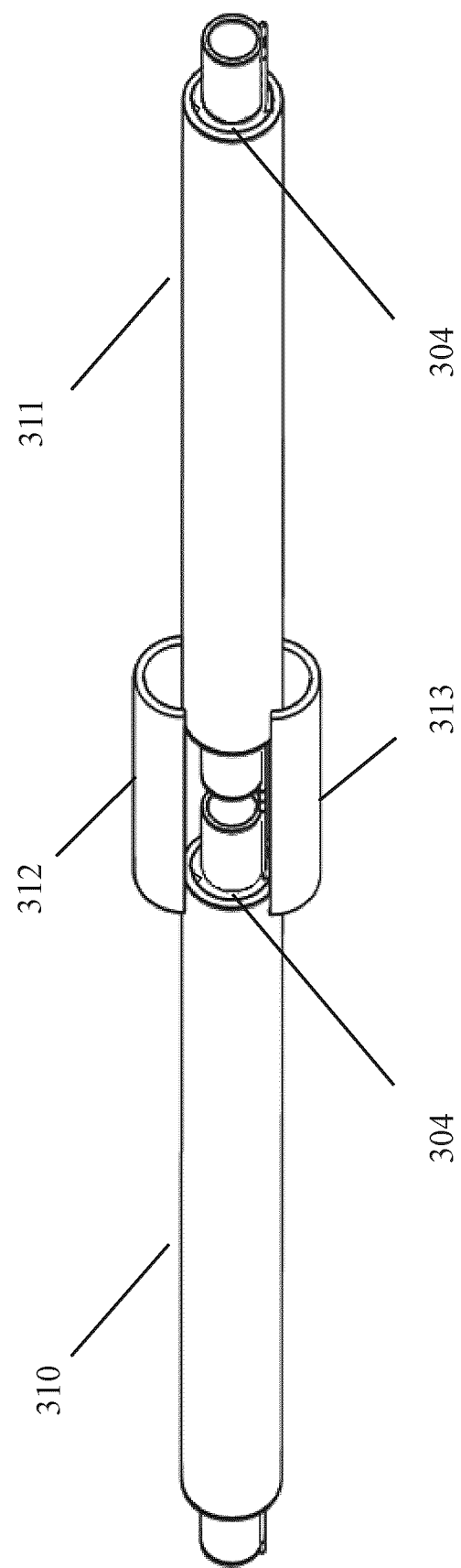
FIG. 3 illustrates a 3D view of a pipe system comprising two pipe apparatuses 310 and 311. Each pipe apparatus is of the same kind as previously described, with segmentation rings 304 at their ends. Once the two pipe apparatuses are ready for the assembly, they are positioned side by side longitudinally, the electric power supply lines being interconnected, and the pipe apparatuses being aligned by the inner pipe layer. The outer pipe layer is shorter than the inner pipe layer to provide enough room to connect the inner pipe layer first and easier assembly of the pipe system. For example, which is not meant to be limiting, if the pipe layers are made of metal, two adjacent inner pipe layers are welded first, and then the outer pipe layers are encased and welded with two external half-rings 312 and 313. The pipe system specifies one front end and one back end that define in which direction the fluid flows inside the inner pipe layer.

Each layer of the pipe system 101 and 102 (see FIG. 1), depending on the particular application, and each segmentation ring 104 can be made of metal, plastic, flexpipe, glass, fiberglass, ceramics, concrete, or a combination thereof, or any other suitable material. The material is generally chosen according to several factors, such as the location of the pipe system, the type of fluid that is being transmitted, and the pressure that each pipe layer should withstand. For example, which is not meant to be limiting, in the traditional case of metal pipe layers, adjacent layers can be welded, first welding two adjacent inner pipe layers and then welding two adjacent outer pipe layers with two external half-rings 312 and 313 (see FIG. 3).

If other materials are to be used, the procedure for connecting and interlocking adjacent pipe apparatuses may be different. For example, which is not meant to be limiting, if at least one of the pipe layers is made of thermoplastic, such as high-density polyethylene (HDPE), heat fusion can be the preferred method for connecting and interlocking two adjacent pipe apparatuses layers of this kind. HDPE is recommended by The Plastics Pipe Institute (Dallas, Tex., USA) as a highly recommended material for building pipe systems due to several major advantages, such as: (a) reduced installation costs, (b) corrosion resistance, (c) excellent flow characteristics, (d) joints as strong as the pipe itself which prevents leakage, (e) lightweight, (f) flexibility and (g) availability in a large range of diameter sizes, from ½" to 63".

Segmentation rings 104 (see FIG. 1) can also be made with a variety of materials. For example, which is not meant to be limiting, polyoxymethylene (POM) can be used for such purpose due to its high strength. As a synthetic polymer, POM is produced with modified formulas and is commercially known under different names, such as Delrin (acetal homopolymer), produced by Ensinger (Washington, Pa., USA). Delrin exhibits several important qualities, such as: (a) low moisture absorption, (b) high strength and (c) chemical resistance to fuels and solvents. Flexibility of the segmentation rings is preferred, as the pipes are often not ideally round.

One important issue when a pipe system is installed in harsh environments is its capacity for handling both high temperatures and vibrations. Therefore, dedicated material may be needed to implement each part of a pipe apparatus. For example, which is not meant to be limiting, each segmentation ring can be implemented with PyroSic® and PiroKarb™, produced by Pyromeral Systems (Barbery, France). These materials are made of glass-ceramic matrix systems reinforced with silicon carbide or carbon fibers. They feature good mechanical strength and resistance to vibrations and have been tested at working temperatures up to 600° C., which is about four times the maximum temperature that Delrin can withstand.

As already mentioned, each segmentation ring has at least two predesigned openings. The predesigned lower opening 105 (see FIG. 1) that hosts the wireless information and communication station 106 and possibly other electronic devices, is to be sealed with an appropriate sealant. The sealant 107 of the predesigned lower openings 105 in the segmentation rings 104 is applied after the electronic devices and the at least one pair of electric power supply lines 108 have been placed in the predesigned lower openings 105 in the segmentation rings 104. Porous films, membranes and foam can be used as a sealant. For example, which is not meant to be limiting, the sealant can be implemented with Firm EPT Foam produced by Nitto (Tokyo, Japan), which has an operating temperature range from −55° C. to 121° C. Such material can be designed to withstand a predetermined pressure, for example, which is not meant to be limiting, one tenth of the maximum pressure that the outer pipe layer can withstand, so that the sealant breaks far before the outer pipe layer does.

Alternatively, sealants predesigned to withstand high temperatures and vibrations can be employed. For example, which is not meant to be limiting, sealant Deacon 7228, by Deacon (Washington, Pa., USA), is a viscous paste that operates in a temperature range from −32° C. to 232° C. Based on the temperature range of interest, different modifications of this sealant can be used.

The electronic devices employed in the presented pipe apparatus can be selected from a large variety of options currently available. For example, which is not meant to be limiting, each wireless information and communication station 106 (see FIG. 1) can be implemented with an XBee device (XB24CZ7UISB003), by Digi (Minnetonka, Minn., USA). XBees come in a large number of varieties and a preferred version contains a radio chip and an integrated microcontroller onboard. A surface-mount version has smaller physical dimensions and can be easily cased in a small package that is airtight sealed with specific material.

Currently, commercially available radio frequency devices are designed to operate in the industrial temperature range from −40° C. to 85° C. (such as, for example which is not meant to be limiting, the XBees). However, if a broader temperature range is needed, the radio frequency device can be developed with the current industry standard high temperature limit of 125° C. For example, which is not meant to be limiting, two different approaches can be taken to address the functionality of the proposed technology in high temperature environments. First, the wireless communication and sensor components can be packaged in a harsh environment packaging, e.g. 32-I/O high-temperature co-fired ceramic (HTCC) alumina package, developed by NASA (Cleveland, Ohio, USA); see L.-Y. Chen, P. G. Neudeck, D. J. Spry, G. M. Beheim and G. W. Hunter, "*Electrical Performance of a High-Temperature 32-I/O HTCC Alumina Package*", in Proceedings of the International Conference on High Temperature Electronics (HiTEC 2016), Albuquerque, USA, 2016, incorporated herein by reference in its entirety. Second, a broader temperature range electronic components can be utilized, e.g. ZG2100M/ZG2101M Wi-Fi® Module, from Microchip Technology (Chandler, Ariz., USA). Finally, the two approaches can be combined for improved high-temperature functionality. It should be mentioned that the industrial high temperature limits for electronic components constantly increase. Therefore, it is expected that high temperature limits for commercially available radio frequency devices and components will soon reach and exceed 150° C.

Both the electronic components and the package that encases them may need to withstand high vibrations within the pipe system. So, a cushion layer can be added around the cased electronic devices within the annular airgap to protect them and to attenuate the vibrations that reach them. A possible approach that can be taken, which is not meant to be limiting, is integrating the cushion layer with a package that can withstand both high temperature and vibrations. For example, which is not meant to be limiting, Swett et al., U.S. Pat. No. 8,922,988, incorporated herein by reference in its entirety, describe a high temperature and vibration protective electronic component packaging that could be used for this purpose, since it has a viscoelastic damping layer configured to reduce external vibrations and strain.

In the event of monitoring a gas pipe system, and in general, the wireless information and communication network can be upgraded to include sensors along the annular airgap. These sensors can be directly connected to the wireless information and communication stations and they can add a unique signature in the wireless information and communication network between the wireless information and communication stations under normal conditions in the annular airgap. Once a gas leaks from the inner pipe layer into the annular airgap, conditions within the annular airgap change and the signature of the sensor located in the portion of the annular airgap where such leakage occurred changes as well, thus identifying that leakage has occurred. A dedicated gas sensor can be used for this application. For example, which is not meant to be limiting, MQ-4 Flammable Gas Sensor from Zhengzhou Winsen Electronics Technology (Zhengzhou, Henan, China) can be used to detect the presence of gas. In addition, more sophisticated sensing methods, such as vibrational properties monitoring, can be used for detecting gas leaks; see J. Backman, A. Järvinen, "*Rechargeable Battery Condition Monitoring using Vibrational Properties*", in Proceedings of the 2014 IEEE Symposium on Product Compliance Engineering (ISPCE), San Jose, USA, 2014, incorporated herein by reference in its entirety.

Any given sensor provides its wireless information and communication station with such information, which is forwarded from one wireless information and communication station to another along the wireless information and communication network, until the at least one central unit is reached. With this approach, the array of sensors within the pipe system monitors undesirable gas activity within the annular airgap. The wireless information and communication network delivers such information to the at least one central unit, which is responsible for keeping a real-time data log.

Not only gas sensors, but also a variety of other sensors can be incorporated in a similar fashion. Below are some examples that are not meant to be limiting.

A pressure sensor can be used to detect the change in pressure conditions within the annular airgap due to a leak from the inner pipe layer. For example, which is not meant to be limiting, a pressure sensor MPL115A1 from Freescale Semiconductor (Austin, Tex., USA) can be used in this case.

An accelerometer can be used to detect any abnormal behaviour in the annular airgap, including internal pressure increase due to leak from the inner pipe layer into the annular airgap. External factors can also be monitored, such as vibrations due to an earthquake or an entity hitting the outer pipe layer. The accelerometer can be positioned in the predesigned upper pressure relief opening and, when the pressure builds up in a given pipe segment, the accelerometer will move away from the predesigned upper pressure relief opening, thus registering this particular motion. For example, which is not meant to be limiting, an accelerometer LIS2DE12 from STMicroelectronics (Geneva, Switzerland) can be used for these purposes.

A pressure relief valve can be used to accommodate the increasing pressure in a given pipe segment due to a leak. The pressure relief valve is positioned in the predesigned upper pressure relief opening and, when there is a leak from the inner pipe layer into the annular airgap, the air contained within the annular airgap of the pipe segment is pushed towards the segmentation rings delimiting the pipe segment.

After the pressure surpasses a predetermined threshold, the pressure relief valve releases the air into the annular airgap of an adjacent pipe segment, thus allowing for the fluid to keep leaking into the annular airgap of the initially leaking pipe segment. For example, which is not meant to be limiting, the Air Safety Valve ST25-1A175 from Grainger (Lake Forest, Ill., USA) can be used as a pressure relief valve.

A humidity sensor can be used to detect the presence of fluid within the annular airgap due to a leak from the inner pipe layer. For example, which is not meant to be limiting, a humidity sensor HDC1000 from Texas Instruments (Dallas, Tex., USA) can be used to detect the presence of fluid.

Accelerometers, pressure sensors, pressure relief valves, gas sensors, humidity sensors and any other appropriate sensors can be installed in the predesigned lower opening or in the predesigned upper pressure relief opening of each segmentation ring. In both cases, they are supplied by the available power supply lines running through the lower openings of the segmentation rings.

The electronic devices that compose each wireless information and communication station are embedded in the segmentation rings and are located within the annular airgap of the pipe system, They are supplied by an external power supply through at least one pair of electric power supply lines 108 (see FIG. 1). XBees operate at a voltage range of 2.1V to 3.6V and draw currents up to 47 mA at the nominal voltage 3.3V. Therefore, one external generator that supplies 1 A current could power up to 21 XBee devices.

For longer pipe systems, a voltage loss compensation circuit can be introduced. For example, which is not meant to be limiting, the external power supply can be set to a higher voltage, such as 10V, and regulators can be installed along the line to supply the electronic devices with the required low-voltage level. Zener diodes can be used to implement these regulators, such as the 3.3V 1N5913B Zener diode by ON Semiconductor (Phoenix, Ariz., USA). An alternative approach is utilizing an integrated voltage regulator, such as the 3.3V LD1117V33 from STMicroelectronics (Geneva, Switzerland).

The proposed pipe system can be deployed utilizing existing pipe systems or can be entirely newly built. In the former case, the existing pipe system can be used as the inner or the outer pipe layer of the new pipe system, therefore becoming necessary to install another pipe layer (either outer or inner), the segmentation rings, the electronic devices, the electric power supply lines and other accessories. In the case of building an entirely new pipe system, a determined number of new pipe apparatuses and accessories are assembled to implement the pipe system.

After the pipe system is installed, the at least one central unit employing specific software is configured to display the information that is acquired from the wireless information and communication network. The software is able to show in real-time the conditions within the pipe system. As an eventual leak occurs from the inner pipe layer of a given pipe apparatus, the software detects such event and informs a human operator that leakage has occurred. The location of the leak and the time when it was detected are provided, as well as the velocity with which the leaked fluid propagates along the annular airgap. The central unit stores a log file containing a status map with the unique identification number and the status of each wireless information and communication station in the wireless information and communication network according to a predetermined protocol. The protocol contains essential definitions, such as the refreshing rate of the status map of all wireless information and communication stations. These definitions are based on the particular needs of the given pipe system. Moreover, the packages exchanged by adjacent wireless information and communication stations will reflect in real time other possible impacts on particular pipe segments, including, but not limited to, earthquakes, sabotage, displacements of any sort, breaks in integrity, etc.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. An interconnectable pipe apparatus comprising:
   (a) inner and outer coaxial pipe layers defining an annular gap between the inner and outer pipe layers, wherein the annular gap is conductive of radio frequency signals;
   (b) at least one segmentation ring, with at least two predesigned openings, defining at least one segment in the interconnectable pipe apparatus;
   (c) sealant sealing some or all predesigned openings of the at least one segmentation ring, the sealant designed to break under certain predetermined pressure;
   (d) a mechanism to relieve pressure in the annular gap as it is being filled with a leak, so that the air in the gap is substituted by the leak;
   (e) a mechanism to connect and interlock the pipe apparatus with at least one other pipe apparatus of the same type, while extending the inner and outer pipe layers at the junction of the two pipe apparatuses and preserving the radio frequency conductivity of the annular gap through the sealant of the segmentation rings;
   (f) at least one electronic information and communication wireless module embedded in the at least one segmentation ring, comprising at least one wireless information and communication station located within the annular gap and which is part of a wireless information and communication network;
   (g) means to detect and locate leaks from the inner and outer pipe layers into the annular gap, utilizing the wireless information and communication network; and
   (h) interconnectable electric power supply lines running through the annular gap.

2. The pipe apparatus of claim 1, in which each pipe layer and each segmentation ring comprises one or more of metal, plastic, high-density polyethylene, flexpipe, glass, fiberglass, ceramic, and concrete.

3. The pipe apparatus of claim 1, in which each segmentation ring has at least one predesigned opening that hosts a wireless information and communication station, the predesigned opening sealed with a sealant designed to break once a predetermined pressure threshold is achieved, the value of the predetermined pressure threshold being lower than the pressure the outer pipe layer can withstand.

4. The pipe apparatus of claim 1, in which each segmentation ring has at least one predesigned opening that provides a mechanism for pressure relief in case of the annular gap experiencing increased pressure due to a leak or due to any other external impact.

5. The pipe apparatus of claim 1, in which the inner pipe layer is weldable to an inner pipe layer of another pipe apparatus of the same type, the outer pipe layer being connected to the outer pipe layer of the other pipe apparatus of the same type by welding two external half-rings embedding the connection between the two adjacent outer pipe layers, while preserving the radio frequency conductivity along the annular gap through the sealant of the at least one segmentation ring.

6. The pipe apparatus of claim 1, in which the inner pipe layer is connected and interlocked to an inner pipe layer of another pipe apparatus of the same type through heat fusion along a border in the connection between the inner pipe layers, the outer pipe layer being connected to an outer pipe layer of another pipe apparatus of the same type by adding two external half-rings that embed the connection between the two adjacent outer pipe layers and utilizing heat fusion along borders of the outer pipe layers and external half-rings, while preserving the radio frequency conductivity along the annular gap through the sealant of the at least one segmentation ring.

7. The pipe apparatus of claim 1, in which at least one wireless device containing an antenna, operating both as a receiver and as a transmitter, is positioned in at least one predesigned opening of a segmentation ring along the annular gap of the pipe apparatus to implement at least one wireless information and communication station, which comprises at least one node within a wireless information and communication network.

8. The pipe apparatus of claim 1, in which each wireless information and communication station is labeled with a unique identification number identifying a respective segment in the pipe apparatus so that, when leakage from an inner or outer pipe layer into the annular gap occurs, the two adjacent segmentation rings retain the leaked content in a segment of the pipe apparatus, thus flooding the annular gap between the adjacent segmentation rings in that segment of said pipe apparatus, and interrupting the wireless communication between two adjacent wireless information and communication stations, identifying the location of the leak based on the status of the affected stations.

9. The pipe apparatus of claim 1, in which at least two interconnectable electric power supply lines run longitudinally through the length of the annular gap and are positioned within the predesigned openings in the segmentation rings, the electric power supply lines used to supply power to the electronic devices embedded in the segmentation rings.

10. The pipe apparatus of claim 1, in which each segmentation ring comprises polyoxymethylene or an acetal homopolymer.

11. The pipe apparatus of claim 1, in which each segmentation ring comprises glass-ceramic matrix systems.

12. The pipe apparatus of claim 1, in which the sealants comprise foam.

13. The pipe apparatus of claim 1, in which each wireless information and communication station is implemented with a programmable radio frequency device.

14. The pipe apparatus of claim 1, in which at least one sensor is integrated into the wireless information and communication stations to monitor the conditions within the annular gap in any given segment of the pipe apparatus, the at least one sensor helping to identify the nature of any leak from the inner or outer piper layer into the annular gap in that segment.

15. The pipe apparatus of claim 1, in which at least one pressure relief valve is integrated into at least one predesigned opening of a segmentation ring to provide a mechanism for pressure relief in case of a rising pressure in the annular gap of a given segment delimited by two adjacent segmentation rings.

16. The pipe apparatus of claim 1, in which one or more electronic components of the pipe apparatus are cased in a high temperature and vibration protective package with predesigned cushion to reduce external vibrations.

17. A pipe system comprising:
(a) at least two pipe apparatuses connected and interlocked, the at least two pipe apparatuses being in accordance with claim 1;
(b) segmentation rings having at least two predesigned openings, the segmentation rings defining a pipe segment and embedding wireless information and communication stations, a mechanism to relieve pressure, and one or more sensors;
(c) a wireless information and communication network having a front end and a back end, deployed within the radio frequency conductive annular gap along the length of the pipe system, with at least one wireless information and communication station per pipe apparatus, the wireless information and communication network wirelessly connected to at least one external central unit;
(d) a map of the networked wireless information and communication stations that identifies uniquely the location of each station within the wireless information and communication network in the pipe system, the map being used to locate any leakage from the inner or outer pipe layer into the annular gap; and
(e) an external power supply that is electrically connected to the at least two electric power supply lines located within the annular gap of each pipe apparatus.

18. A conduit comprising:
inner and outer coaxial conduit layers defining an annular gap between the inner and outer conduit layers;
at least one segmentation ring positioned within the annular gap and comprising at least one opening formed therein, the at least one segmentation ring defining a first annular gap portion on one side of the at least one segmentation ring, and a second annular gap portion on the other side of the at least one segmentation ring;
a sealant sealing the at least one opening, wherein the sealant is configured to break upon application of a predetermined pressure to the sealant and thereby cause the first and second annular gap portions to enter into fluid communication with one another;
a wireless communication device comprised within the segmentation ring and configured to receive wireless communications via the annular gap; and
a mechanism for relieving pressure in the annular gap in response to the annular gap being flooded by a leak, so that air in the gap may be substituted by the leak.

19. The conduit of claim 18, wherein the at least one segmentation ring comprises multiple segmentation rings, and wherein the wireless communication device comprised in one of the segmentation rings is configured to receive wireless communications via the annular gap from another wireless communication device comprised in an adjacent segmentation ring unless the annular gap portion between the adjacent segmentation rings is flooded with a leak.

20. A method of detecting a leak in a conduit, comprising determining that communications between adjacent wireless communication devices have been interrupted, wherein the adjacent wireless communication devices are comprised in respective adjacent segmentation rings positioned within an annular gap defined between inner and outer conduit layers of a conduit.

* * * * *